(12) United States Patent
Johansson et al.

(10) Patent No.: US 11,781,655 B2
(45) Date of Patent: Oct. 10, 2023

(54) SEALING MEMBER AND SEALING SYSTEM COMPRISING THE SEALING MEMBER

(71) Applicant: Husqvarna AB, Huskvarna (SE)

(72) Inventors: Jörgen Johansson, Jönköping (SE); Stefan Stark, Huskvarna (SE); Lars Ederfors, Bankeryd (SE)

(73) Assignee: HUSQVARNA AB, Huskvarna (SE)

( * ) Notice: Subject to any disclaimer, the term of this patent is extended or adjusted under 35 U.S.C. 154(b) by 78 days.

(21) Appl. No.: 17/328,359

(22) Filed: May 24, 2021

(65) Prior Publication Data
US 2021/0388905 A1    Dec. 16, 2021

(30) Foreign Application Priority Data

Jun. 10, 2020 (SE) .................................. 2050681-2

(51) Int. Cl.
| | |
|---|---|
| *A01D 34/81* | (2006.01) |
| *F16J 15/36* | (2006.01) |
| *B25J 19/00* | (2006.01) |
| *A01D 34/00* | (2006.01) |
| *A01D 101/00* | (2006.01) |

(52) U.S. Cl.
CPC .............. *F16J 15/36* (2013.01); *A01D 34/81* (2013.01); *B25J 19/0075* (2013.01); *A01D 34/008* (2013.01); *A01D 2101/00* (2013.01)

(58) Field of Classification Search
CPC ........ F16J 15/36; A01D 34/81; B25J 19/0075
See application file for complete search history.

(56) References Cited

U.S. PATENT DOCUMENTS

| | | | |
|---|---|---|---|
| 5,161,651 A | 11/1992 | Weiler et al. | |
| 2003/0218304 A1 | 11/2003 | Westhoff et al. | |
| 2012/0023721 A1* | 2/2012 | Glachet | B25J 21/02 |
| | | | 277/637 |

(Continued)

FOREIGN PATENT DOCUMENTS

| | | |
|---|---|---|
| CA | 2173334 A1 | 4/1995 |
| CN | 1547646 A | 11/2004 |

(Continued)

OTHER PUBLICATIONS

Office Action and Search Report for Swedish Application No. 2050681-2 dated Jan. 26, 2021.

*Primary Examiner* — Vishal A Patel
(74) *Attorney, Agent, or Firm* — Burr & Forman LLP

(57) ABSTRACT

A sealing member (2), for waterproof sealing of a volume, comprises a hollow, generally cylindrical body and a sealing area (5a, 5b) at the respective axial ends thereof. At least one sealing area (5a) comprises a first radially extending portion (6) and a second portion (7) extending in a reverse direction partly overlapping the first portion. The second portion (7) has a free end and is arranged for pressing towards the first portion (6), thereby forming a seal with the first portion (6). A sealing system comprises a sealing member (2) as above, a sealing seat (9) for abutment against the sealing member (2), and a counterpart surface (11), for pressing the sealing member (2) against the sealing seat (9). The sealing seat (9) comprises an inclined surface (10).
A work tool (1) comprising the above-mentioned sealing system has at least one sealing area (5a) of the sealing member (2) pressed between a housing (4) and a chassis (3) of the work tool (1).

20 Claims, 4 Drawing Sheets

(56) References Cited

U.S. PATENT DOCUMENTS

2016/0102703 A1    4/2016  Hosen et al.
2020/0191216 A1*  6/2020  Takeuchi ................. F16J 15/50

FOREIGN PATENT DOCUMENTS

| CN | 1661252 | A |   | 8/2005 |   |   |
|----|---------|----|---|--------|---|---|
| CN | 108366533 | A |   | 8/2018 |   |   |
| DE | 19507597 | A1 |   | 9/1996 |   |   |
| EP | 1488118 | B1 |   | 4/2007 |   |   |
| EP | 2869691 | B1 |   | 8/2017 |   |   |
| EP | 3225094 | A1 |   | 10/2017 |   |   |
| EP | 3549427 | A1 |   | 10/2019 |   |   |
| EP | 3549429 | A1 | * | 10/2019 | ........... | A01D 34/001 |
| EP | 3549429 | A1 |   | 10/2019 |   |   |
| EP | 3395149 | B1 |   | 12/2019 |   |   |
| JP | 2021042833 | A |   | 3/2021 |   |   |
| SE | 543943 | C2 | * | 9/2021 |   |   |
| WO | 9509998 | A1 |   | 4/1995 |   |   |

* cited by examiner

SEALING MEMBER AND SEALING SYSTEM COMPRISING THE SEALING MEMBER

FIELD OF THE INVENTION

The present disclosure relates to a sealing member, for waterproof sealing of a volume, the sealing member comprising a hollow, generally cylindrical body and a sealing area at the respective axial ends thereof, and at least one sealing area comprising a first radially extending portion and a second portion extending in a reverse direction partly overlapping the first portion and having a free edge.

The disclosure also relates to a sealing system comprising a sealing member.

The disclosure further relates to a work tool comprising the sealing system.

BACKGROUND

EP 3549427A1 discloses a lawn mower robot, wherein a sealing portion is arranged to seal between the inner body and the blade protection cover. The flat top and bottom edges of the sealing portion are pressed between flat surfaces of the inner body and the blade protection cover.

EP3395149B1 discloses a lawn mower robot, wherein a sealing portion is arranged to seal around the lower portion of a motor housing. The top and bottom sections of the sealing portion are provided with a thickened profile in comparison with the rest of the sealing portion. The shape of the profile is adapted to snap fit into corresponding recesses.

The proposed solutions for fastening a sealing member may work well under certain circumstances, although their respective sealing effects may not be sufficient for all applications. In certain situations, e. g. where frequent cleaning of the underside of a lawn mower or of any robotic work tool is needed and expected, the sealing may not be sufficient against rinsing with a garden hose.

Another problem that may occur in the long run, if plastic parts are pressed tightly against a solid sealing member, in order to obtain a tighter seal, is that the plastic material may deform or creep over time.

SUMMARY

It is an object of the present invention to solve, or at least mitigate, parts or all of the above-mentioned problems. To this end, the second portion of the sealing area is arranged for pressing towards the first portion, thereby forming a seal with the first portion.

This solves the problem of providing a waterproof seal between two connected parts, where the tolerances of the dimensions of the respective parts, and hereby the distances, which are to be bridged by the seal, are large. Also, when the two portions of the sealing area are pressed towards one another, the resilient force will be limited. Hereby the stress on the connected parts is limited. Such stress could otherwise cause deformations and creeping of the material in the parts, and thus the risk of leakage over time is reduced or eliminated with the disclosed sealing member.

In an embodiment of the invention, at least one of the first and the second portions is curved, to form a seal with an oval cross-section when the portions are pressed towards one another.

Hereby the effects of a seal with a limited stress on the connected parts are further enhanced. The oval cross section provides a sealing force particularly in the direction of its major axis, while the contact area is particularly large in the direction of the minor axis.

In an embodiment of the invention, at least one of the first and the second portions is curved, to form a seal with a ring-shaped cross-section when the portions are pressed towards one another.

Hereby the effects of a seal with a limited stress on the connected parts are also further enhanced.

In a further embodiment, the first and second portions enclose a volume of air when pressed towards one another.

Hereby the effect is attained that the air will provide a more easily compressible sealing, thereby reducing the stress of the connected parts, as well as the risk of creep and leakage.

In another embodiment, the first and second portions together form a C-shaped cross-section in an unloaded state.

Providing the seal with a suitable form in its unloaded state will make it likely that it deforms into a desired shape with excellent sealing properties when pressure is applied thereon. The need for complicated measures for holding the seal and the parts in place while they are mounted may be minimal.

In yet another embodiment, the generally cylindrical body is pleated to form a bellows.

Hereby the length of the sealed volume may be changed, while the sealing at the ends of the volume remain unaffected. This may be useful e. g. when the sealed volume encloses a movable object, such as a cutting unit in a lawn mower.

In a second aspect of the disclosure, the sealing system has a sealing seat for abutment against the sealing member, and a counterpart surface, for pressing the sealing member against the sealing seat.

Hereby the sealing effect may be enhanced, as a relative axial motion of the sealing seat and the counterpart surface may result in the counterpart surface pushing the sealing area of the sealing member towards the sealing seat.

In a further embodiment of the second aspect of the disclosure, the sealing seat comprises an inclined surface, such that a transition between the first and second portions of the sealing area abuts the inclined surface.

Hereby the sealing effect may be enhanced, as a relative axial motion of the sealing seat and the counterpart surface may result in the counterpart surface pushing the sealing area of the sealing member towards that part of the inclined surface which is closer to the sealing area. Hereby a gradually increasing radial contact force from the inclined surface on the sealing member is provided.

In an embodiment of the second aspect, the sealing seat extends in a circle, and the inclined surface is frusto-conical.

Hereby the contact force from the inclined surface, and the sealing effect, will be evenly distributed around the sealing seat.

In a further embodiment, the sealing seat comprises a circumferential bead at a free end thereof.

This may have the effect of keeping the sealing member in position shortly before and during the mounting of the connected parts, which are to be sealed.

In a still further embodiment, the counterpart surface comprises a circumferential bead.

In further embodiments, the sealing area comprises a recess for interlocking engagement with the bead.

Hereby the positioning of the sealing member is further improved when the bead on the sealing seat or the counterpart surface, respectively, meshes with the recess on the sealing area. Also an enhanced sealing effect may be attained, as the bead and recess may form a part of a labyrinth seal.

In a third aspect of the disclosure, the work tool comprising the sealing system has at least one sealing area of the sealing member, and the sealing area is pressed between a hole in a screen and an item extending through the screen.

This has the effect of facilitating cleaning of the underside of the work tool, with a reduced risk of leakage of water into the insides of the work tool.

In an embodiment of the third aspect, at least one of the screen and the item is manufactured from plastics.

Hereby the work tool may be manufactured from a lightweight and durable material, which may accommodate the sealing member well. The benefits of the above described sealing member may be particularly noticeable in a plastics construction.

In a further embodiment, the work tool is a robotic work tool.

An advantage is that all of the previous features are particularly useful on a robotic work tool, since such a tool will operate unsupervised for extended periods of time. For that reason, there is a need for watertight sealing as well as for frequent cleaning operations.

In a still further embodiment of the disclosure, the work tool is a lawn mower.

The advantage of this feature is that a watertight seal is applied on a work tool which is used in such an environment that there is a need for frequent cleaning, and the waterproof seal may be useful.

In an even further embodiment, the screen is the lower plate of a chassis, and the item is a part of the housing.

Particular advantages may be attained hereby, if the sealing system is used for sealing between the housing and the chassis of the work tool.

It is noted that embodiments of the invention may be embodied by all possible combinations of features recited in the claims. Further, it will be appreciated that the various embodiments described for the device are all combinable.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

Figure 1:
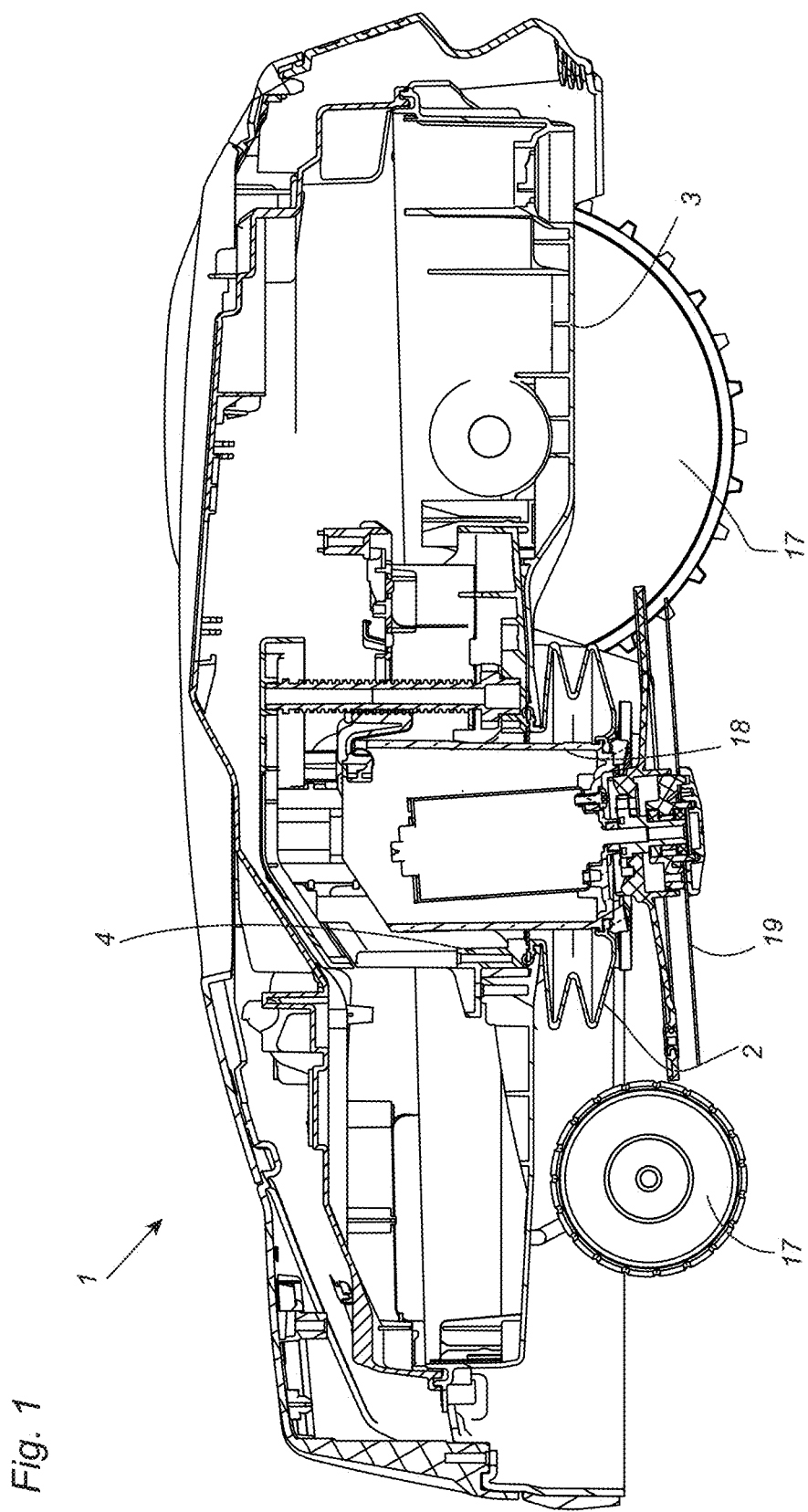
FIG. 1 is a sectional view of a robotic work tool, comprising a sealing member according to the disclosure.

FIG. 1 illustrates a work tool 1, which in the disclosed embodiment is a robotic lawn mower. The lawn mower 1 comprises a chassis 3 with wheels 17 and a housing 4, which is movably attached to the chassis 3. A lawn mowing unit 18 comprising knives 19 extends downwards through the housing 4 and chassis 3. The lawn mowing unit 18 is surrounded by a sealing member 2, which to a large extent protects the lawn mowing unit 18 from dirt and debris from the lawn mowing. The sealing member 2 has a generally cylindrical shape, and is provided with circumferential pleats, in order to form a bellows-like shape that will accommodate the vertical movement of the lawn mowing unit 18, when the cutting height is adjusted.

The sealing member 2 is attached at its upper end to the work tool 1, preferably clamped between the chassis 3 and the housing 4. The joint between the chassis 3 and the housing 4 needs to be sealed to provide water and dirt to enter the inner spaces of the chassis 3, so that the lifespan of the work tool 1 will be as long as possible. Also, since the outside of the chassis 3 should be regularly cleaned, the joint between the chassis and the housing 4, where the sealing member 2 is fixed, needs to be watertight as well, in order to keep water from entering the inside of the chassis 3.

Figure 2A:
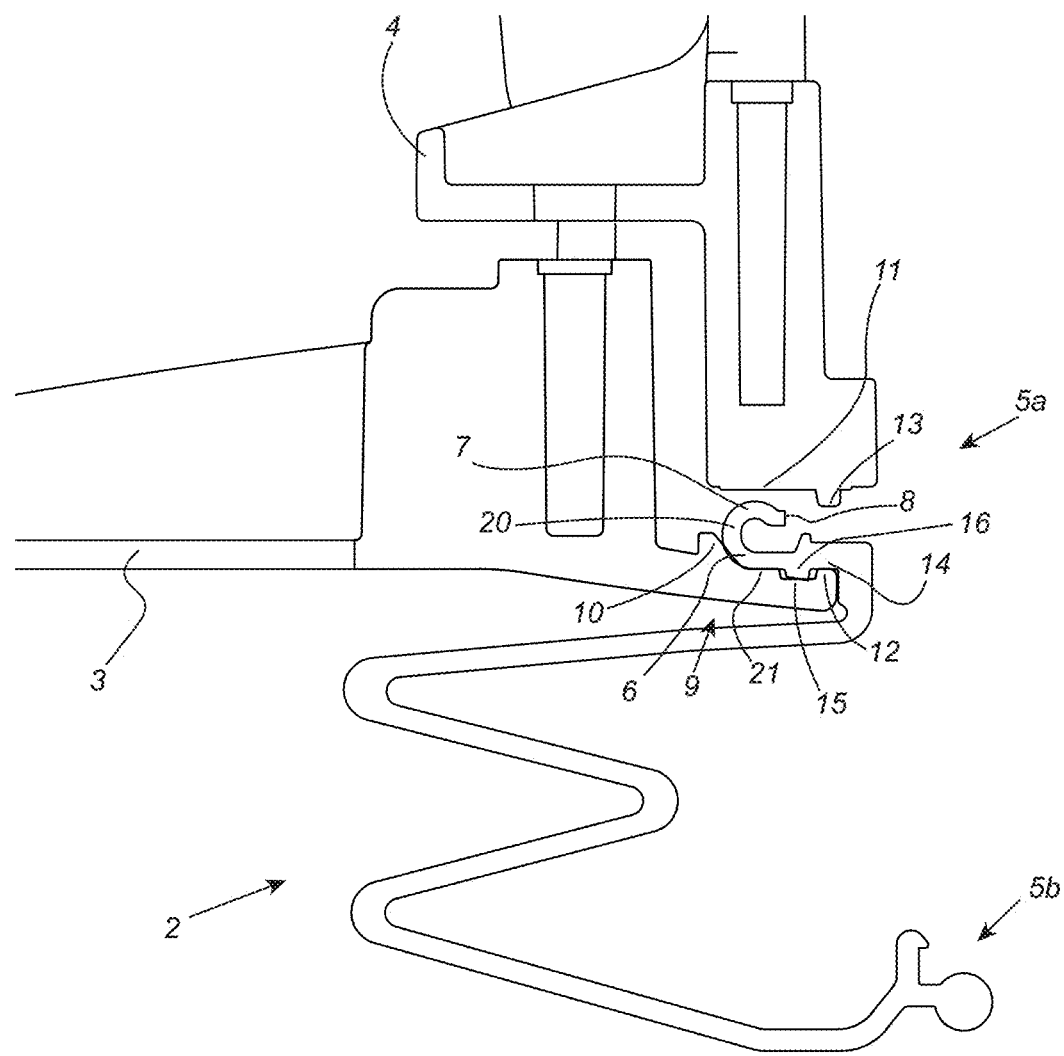
FIG. 2a is a closeup sectional view of the sealing member in a first state.

FIG. 2a discloses the sealing member 2 in greater detail. Only a section of the sealing member 2 is disclosed, but since the sealing member 2 and its fixation are approximately cylindrical, all the necessary information should be apparent from FIGS. 2a-2c.

At the axial ends of the sealing member 2, there are sealing areas 5a, 5b. The lower sealing area 5b is attached to the lower end of the lawn mowing unit 18, so that the knives 19 extend therefrom, but the details of the sealing will not be a part of the present disclosure.

The upper sealing area 5a of the sealing member 2 is arranged to be clamped between a sealing seat 9 arranged on the chassis 3 and a counterpart surface 11 arranged on the housing 4. A first portion 6 of the sealing area 5a extends radially outwards from the upper end of the sealing member 2. A second portion 7 of the sealing area 5a is joined to the first portion 6 and extends inwards, i.e. in a reverse direction as compared to the first portion. The second portion 7 overlaps the first portion 6 as seen in an axial direction of the sealing member 2. In an unloaded state, as shown in FIG. 2a, the second portion 7 and the first portion 6 are arranged at a distance from one another, together forming a circumferential sealing area 5a with a C-shaped cross-section. The first 6 and second 7 portions are joined at a transition 20. The second portion 7 of the sealing area 5a has a free end 8, which is directed inwards in the radial direction of the sealing member 2.

In FIG. 2a, the sealing area 5a of the sealing member 2 is positioned on the sealing seat 9 of the chassis 3. The first portion 6 is in contact with a planar, annular area 21 of the sealing seat 9. The transition 20 lightly touches an annular, inclined surface 10 of the sealing seat 9. The inclined surface 10 has a frustoconical shape, which is arranged radially outside of the planar annular area 21 of the sealing seat 9.

At the radially inner end of the sealing seat 9 an annular bead 12 may be provided. Also, a circumferential recess 15 may be provided between the annular bead 12 and the planar annular area 21. The sealing member 2 may be provided with a circumferential recess 14 mating with the annular bead 12. The sealing member 2 may also be provided with a circumferential bead 16 mating with the circumferential recess 15 of the sealing seat 9. The sealing member 2 may form a labyrinth seal with the sealing seat 9 due to the respective beads 12, 16 and recesses 14, 15. Also, the beads 12, 16 and recesses 14, 15 may serve to position the sealing member 2 correctly before it is clamped between the chassis 3 and the housing 4.

The counterpart surface 11, formed on the lower part of the housing 4, may be planar, to contact with the upper side of the second portion 7 of the sealing area 5a, when the housing 4 is brought into contact with the chassis 3. In order to increase the clamping effect further, an annular bead 13 may be arranged on the counterpart surface 11, in the disclosed arrangement opposite the bead 12.

Figure 2B:
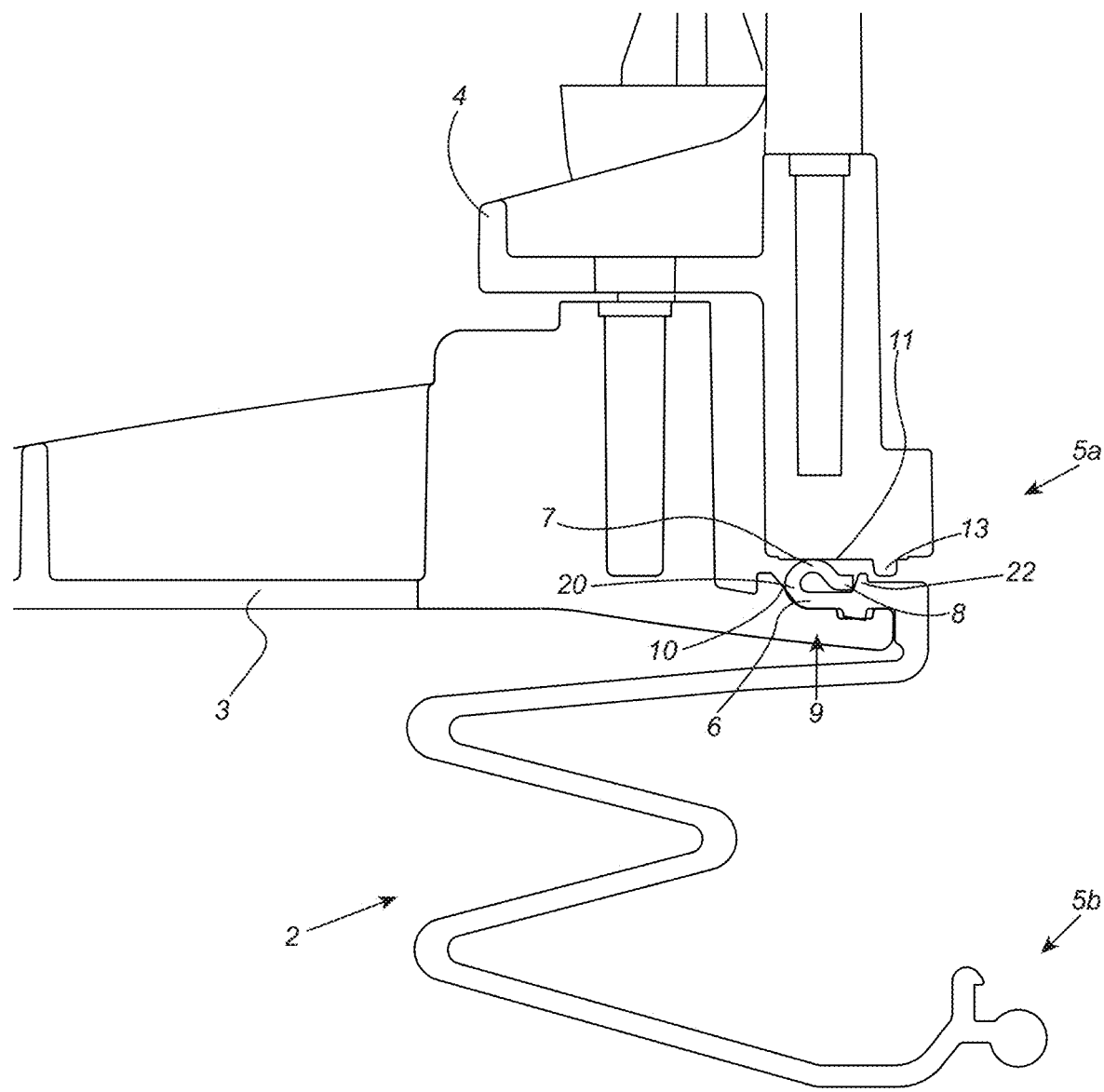
FIG. 2b is a view according to FIG. 2a of the sealing member in a second state.

FIG. 2b discloses a second state of the sealing arrangement shown in FIG. 2a. The assembly of the chassis 3 and the housing 4 has started, and the sealing area 5a is partly compressed. The second portion 7 is in contact with the counterpart surface 11, and it has been compressed towards the first portion 6, and may form a tubular shape, where the free end 8 of the second portion 7 may be in contact with an upper lip 22 of the sealing area 5a. Air may be enclosed in the tubular shape formed by the first and second portions 6, 7 of the sealing area 5a, which may make the sealing area 5a readily compressible, while the second portion 7 and the transition 20 are elastic, and are ready to regain their original shape when the pressure from the counterpart surface 11 is decreased. The partly compressed sealing area 5a may also start to exert a pressure radially on the inclined surface 10 in contact with the transition 20, which extends radially outwards when the sealing area 5a is compressed.

Figure 2C:
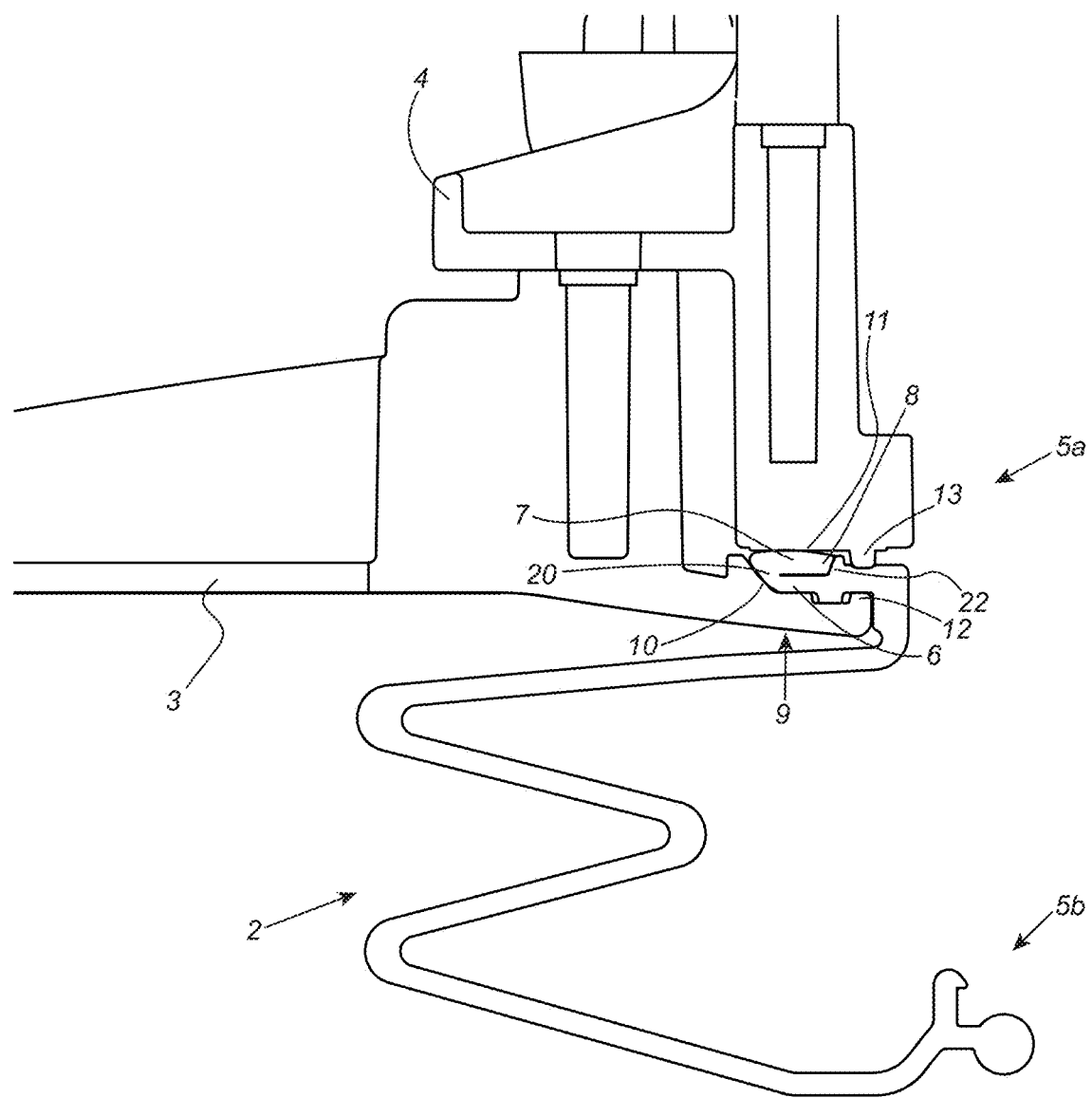
FIG. 2c is a view according to FIGS. 2a and 2b of the sealing member in a third state.

In FIG. 2c, the sealing area 5a is fully compressed. The chassis 3 and the housing 4 have reached their final mounted positions, and the sealing area 5a is compressed between the sealing seat 9 and the counterpart surface 11. In this state the transition 20 seals against a major part of the inclined, frustoconical surface 10. Also, there is a sealing abutment of the second portion 7 of the sealing area 5a against the counterpart surface 11.

In order to reach this compressed, sealing state, the tubular shape shown in FIG. 2b has been compressed, which has required a smaller compression force, than the compression of a solid sealing ring, e. g. an O-ring, would have required. The limited force needed will result in a limited counter force on the sealing seat 9 and the counterpart surface 11. The components, i. e. the chassis 3 and the housing 4, are manufactured from plastics. For this reason, the superior sealing effect obtained with a limited force is advantageous. The risks of deformations and creeping of the comprised components are limited or eliminated.

The circumferential bead 13 next to the counterpart surface 11 clamps the sealing member 2 against the bead 12 on the sealing seat 9. There may be a certain sealing effect in the abutment of the beads 12, 13 against the sealing member 2, but a non-negligible effect is that of fixing the sealing member 2 in its position.

The labyrinth seal formed with the respective beads 12, 16 and recesses 14, 15 (see FIG. 2a) of the sealing seat 9 and the sealing member 2, and described above in connection with FIG. 2a, may work as a complement to the sealing effect of the first 6 and second 7 portions of the sealing area 5a.

The invention has mainly been described above with reference to a few embodiments. However, as is readily appreciated by a person skilled in the art, other embodiments than the ones disclosed above are equally possible within the scope of the invention, as defined by the appended patent claims.

For example, although a robotic lawn mower 1 has been disclosed as an example, it needs to be emphasized that the disclosed sealing member may be applied in many other work tools, i.e. not only lawn mowers and not only work tools that are robotic. The sealing member 2 may be of many different general configurations, while the disclosed configuration of the sealing area 5a in at least one end thereof is one and the same.

In the claims, the word "comprising" does not exclude other elements or steps, and the indefinite article "a" or "an" does not exclude a plurality.

The invention claimed is:

1. A work tool comprising:
   a chassis operably coupled to a plurality of wheels;
   a housing movably operably coupled to the chassis;
   a lawn mowing unit extending through the chassis and housing; and
   a sealing member comprising a hollow, generally cylindrical body, disposed around the lawn mowing unit and between the chassis and the housing,
   wherein the sealing member has a first sealing area disposed proximate to a lower end of the lawn mower at a first axial end of the generally cylindrical body and a second sealing area disposed between the chassis and the housing at a second axial end of the generally cylindrical body,
   wherein the second sealing area has a C shaped cross section comprising a first extension portion disposed at a top side of the C shaped cross section and a second extension portion disposed at a bottom side of the C shaped cross section, and
   wherein a circumferential bead disposed on the second extension portion of the C shaped cross section is seated within a circumferential recess in a sealing seat of the chassis to secure the second sealing area in place.

2. The work tool of claim 1, wherein the first extension portion of the C shaped cross section is compressible toward the second extension portion, and
   wherein the C shaped cross section forms a seal between the chassis and the housing responsive to the housing compressing the first extension portion toward the chassis and the second extension portion.

3. The work tool of claim 2, wherein the first extension portion and the second extension portion of the second sealing area enclose a volume of air when compressed toward one another.

4. The work tool of claim 1, wherein the generally cylindrical body is pleated to form a bellows.

5. The work tool of claim 1, wherein the sealing seat further comprises an inclined surface, such that a transition between the first extension portion and the second extension portion of the second sealing area contacts the inclined surface when the first extension portion and the second extension portion are pressed toward each other.

6. The work tool of claim 5, wherein the sealing seat extends in a circle, and the inclined surface is frusto-conical.

7. The work tool of claim 1, wherein the second sealing area of the sealing member is pressed between a hole in a lower plate of the chassis and a part of the housing extends through the hole.

8. The work tool of claim 7, wherein at least one of the lower plate of the chassis and the part of the housing is manufactured from plastics.

9. The work tool of claim 7, wherein the work tool is a robotic work tool.

10. The work tool of claim 7, wherein the work tool is a lawn mower.

11. A work tool comprising:
    a chassis operably coupled to a plurality of wheels;
    a housing movably operably coupled to the chassis;

a lawn mowing unit extending through the chassis and housing; and a sealing member comprising a hollow, generally cylindrical body, disposed around the lawn mowing unit and between the chassis and the housing, wherein the sealing member has a first sealing area disposed proximate to a lower end of the lawn mower at a first axial end of the generally cylindrical body and a second sealing area disposed between the chassis and the housing at a second axial end of the generally cylindrical body, wherein the second sealing area has a C shaped cross section comprising a first extension portion disposed at a top side of the C shaped cross section and a second extension portion disposed at a bottom side of the C shaped cross section, and wherein the first extension portion is compressible toward the second extension portion, and wherein the first extension portion is restrained from inward radial movement by a lip disposed proximate to the second extension portion responsive to compression of the first extension portion toward the second extension portion.

12. The work tool of claim 11, wherein the C shaped cross section forms a seal between the chassis and the housing responsive to the housing compressing the first extension portion toward the chassis and the second extension portion.

13. The work tool of claim 12, wherein the first extension portion and the second extension portion of the second sealing area enclose a volume of air when compressed toward one another.

14. The work tool of claim 11, wherein the generally cylindrical body is pleated to form a bellows.

15. The work tool of claim 11, wherein the sealing seat further comprises an inclined surface, such that a transition between the first extension portion and the second extension portion of the second sealing area contacts the inclined surface when the first extension portion and the second extension portion are pressed toward each other.

16. The work tool of claim 15, wherein the sealing seat extends in a circle, and the inclined surface is frusto-conical.

17. The work tool of claim 11, wherein the second sealing area of the sealing member is pressed between a hole in a lower plate of the chassis and a part of the housing extends through the hole.

18. The work tool of claim 17, wherein at least one of the lower plate of the chassis and the part of the housing is manufactured from plastics.

19. The work tool of claim 17, wherein the work tool is a robotic work tool.

20. The work tool of claim 17, wherein the work tool is a lawn mower.

* * * * *